Figure 1A:
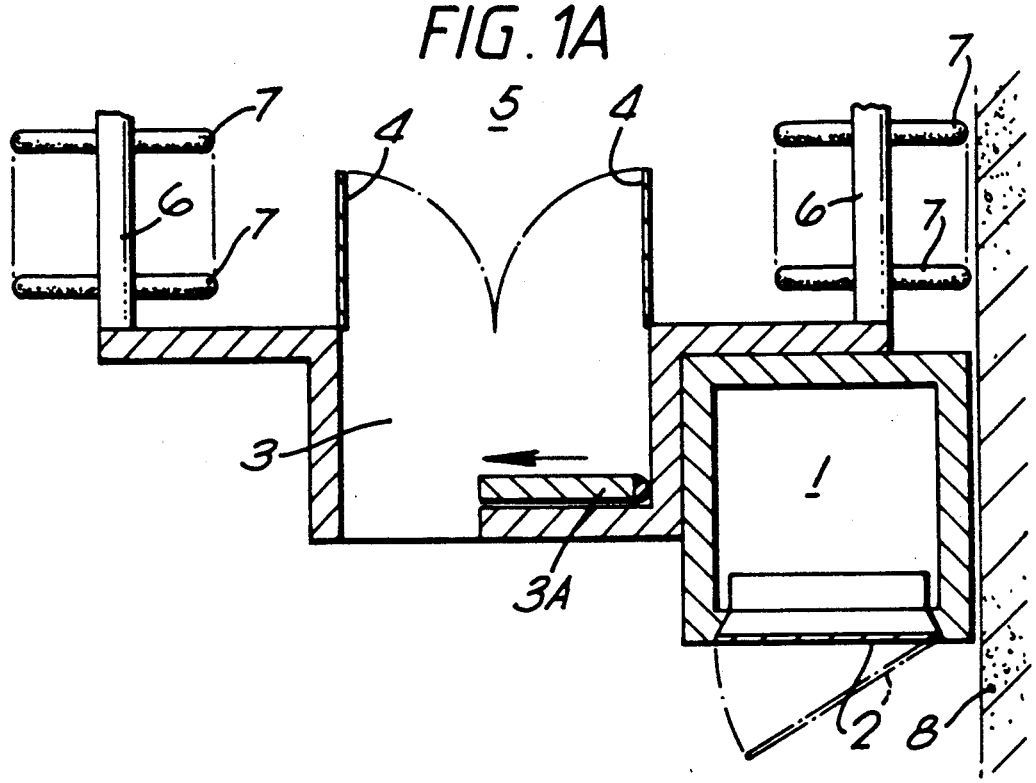

United States Patent [19]

Varley

[11] Patent Number: 5,025,140

[45] Date of Patent: Jun. 18, 1991

[54] APPARATUS FOR RECEIVING ARTICLES, STORING THEM AFTER PROCESSING AND SUBSEQUENTLY RE-ISSUING THEM

[76] Inventor: Clement Varley, 110 Gregories Road, Beaconsfield, Buckinghamshire, England

[21] Appl. No.: 215,035

[22] Filed: Jul. 5, 1988

[30] Foreign Application Priority Data

Jul. 2, 1987 [GB] United Kingdom ............... 8715543

[51] Int. Cl.⁵ .................... G06F 15/24; G06F 7/08
[52] U.S. Cl. ..................... 235/385; 235/381; 235/383; 235/384; 364/403
[58] Field of Search ............ 235/381, 383, 384, 385, 235/454, 462, 380; 364/403

[56] References Cited

U.S. PATENT DOCUMENTS

| | | | |
|---|---|---|---|
| 4,519,522 | 5/1985 | McElwee | 235/462 X |
| 4,550,246 | 10/1985 | Markmann | 235/385 |
| 4,605,847 | 8/1986 | Schittko et al. | 235/454 X |
| 4,803,348 | 2/1989 | Lohrey et al. | 235/381 |

FOREIGN PATENT DOCUMENTS

| | | |
|---|---|---|
| 1107988 | 3/1968 | United Kingdom . |
| 1317306 | 5/1973 | United Kingdom . |
| 1423135 | 1/1976 | United Kingdom . |
| 1604040 | 12/1981 | United Kingdom . |
| 2080264 | 2/1982 | United Kingdom . |

Primary Examiner—Stuart S. Levy
Assistant Examiner—Steven M. duBois
Attorney, Agent, or Firm—Basile and Hanlon

[57] ABSTRACT

An apparatus for receiving articles to be processed, for storing the articles, and subsequently reissuing processed articles to appropriate customers in response to customer-supplied information includes a plurality of first and second article carriers for receiving articles to be processed and for carrying processed articles, respectively. First and second article carrier storage areas are provided for the first and second article carriers, respectively. First and second identification members are used to uniquely identify each separate one of the plurality of first article carriers and to uniquely identify each separate article carrier storage location, respectively. A transport mechanism is provided for selectively transporting a first article carrier from the first storage area to an article reception location for loading by a customer, and for selectively transporting a second article carrier from the second storage area to an article reissue location for retrieval of the article by the customer after processing. A control system, responsive to customer-supplied information, selectively activates the transport mechanism for automated handling of the articles. The control system includes input mechanisms for receiving data corresponding to the first and second identification members and customer-supplied information. The control system creates first and second temporary data relationships between the customer-supplied information and a particular unique first identification member in the first instance, and subsequently creates a second temporary data relationship between the customer-supplied information and a particular second identification member defining a specific location within the second storage area.

10 Claims, 5 Drawing Sheets

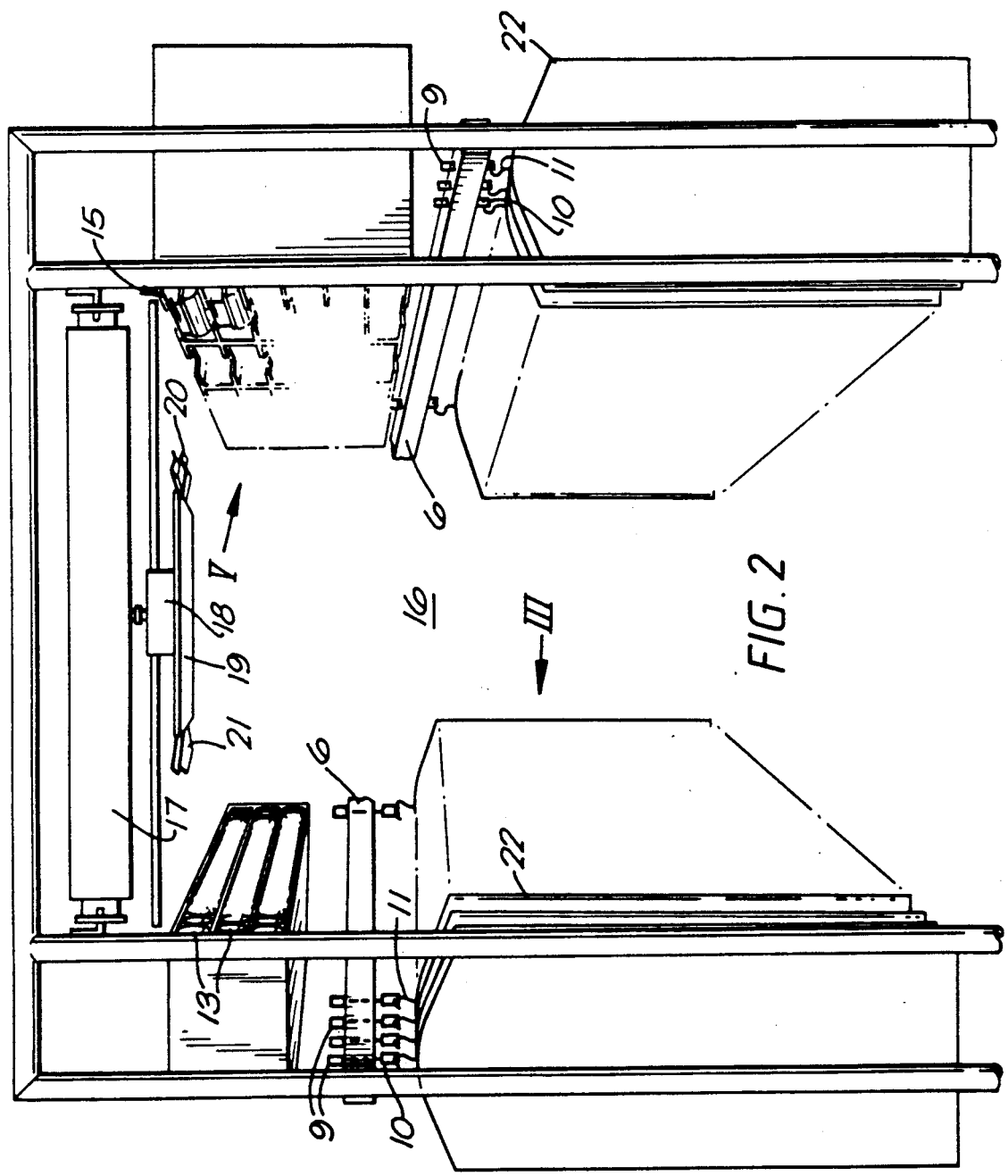

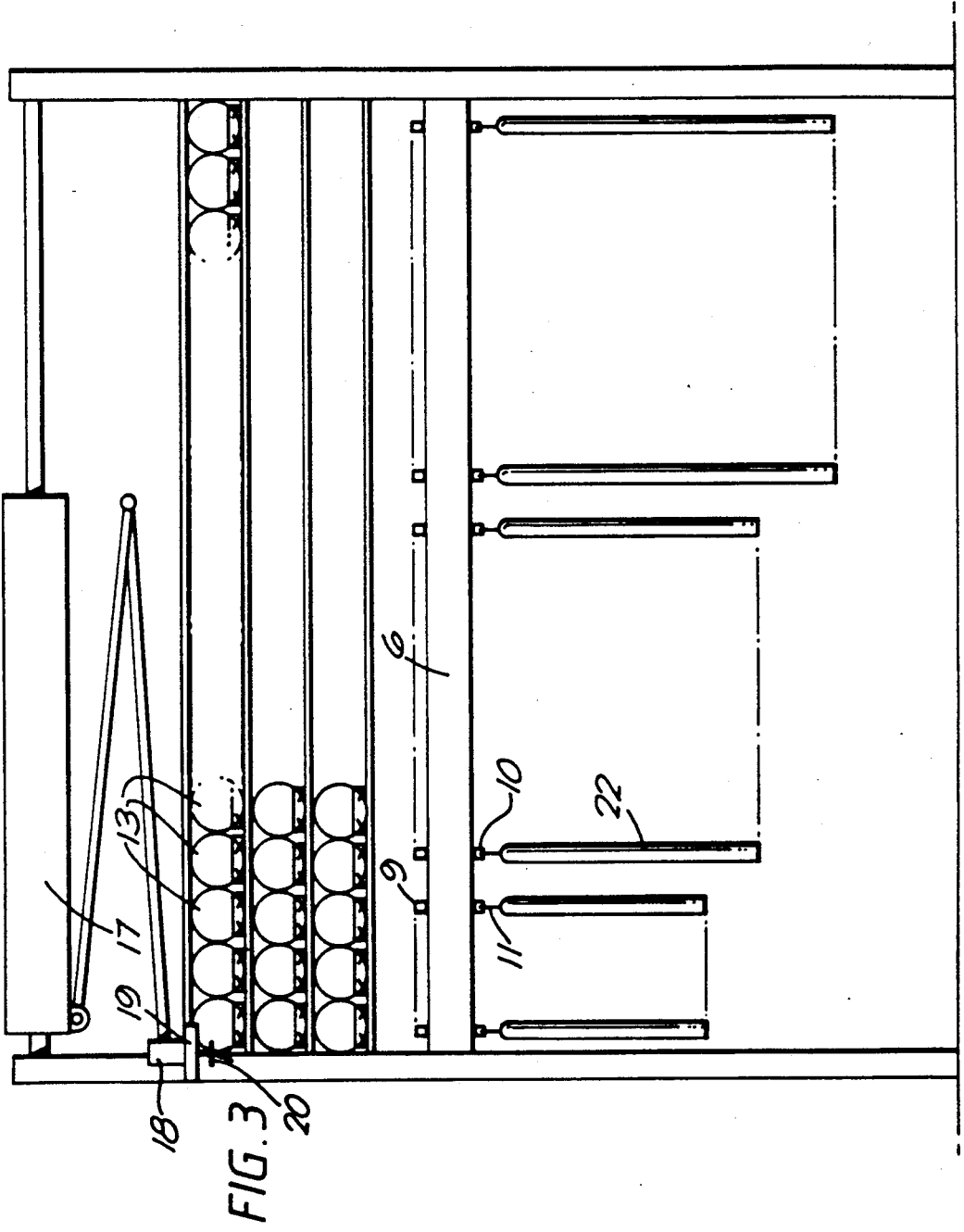

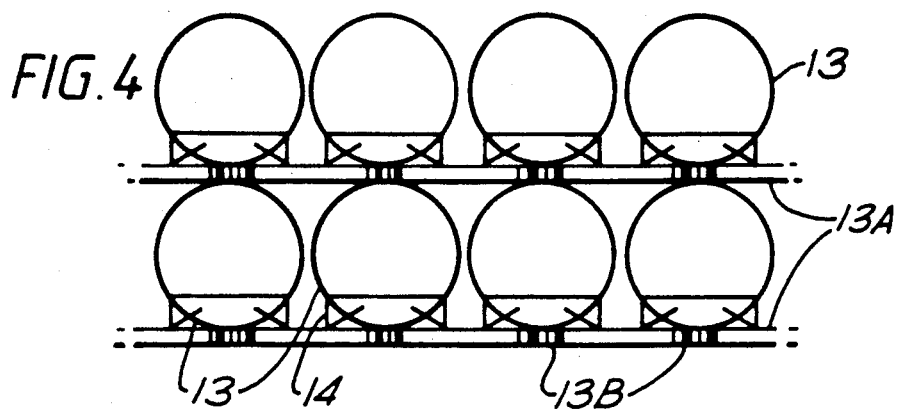
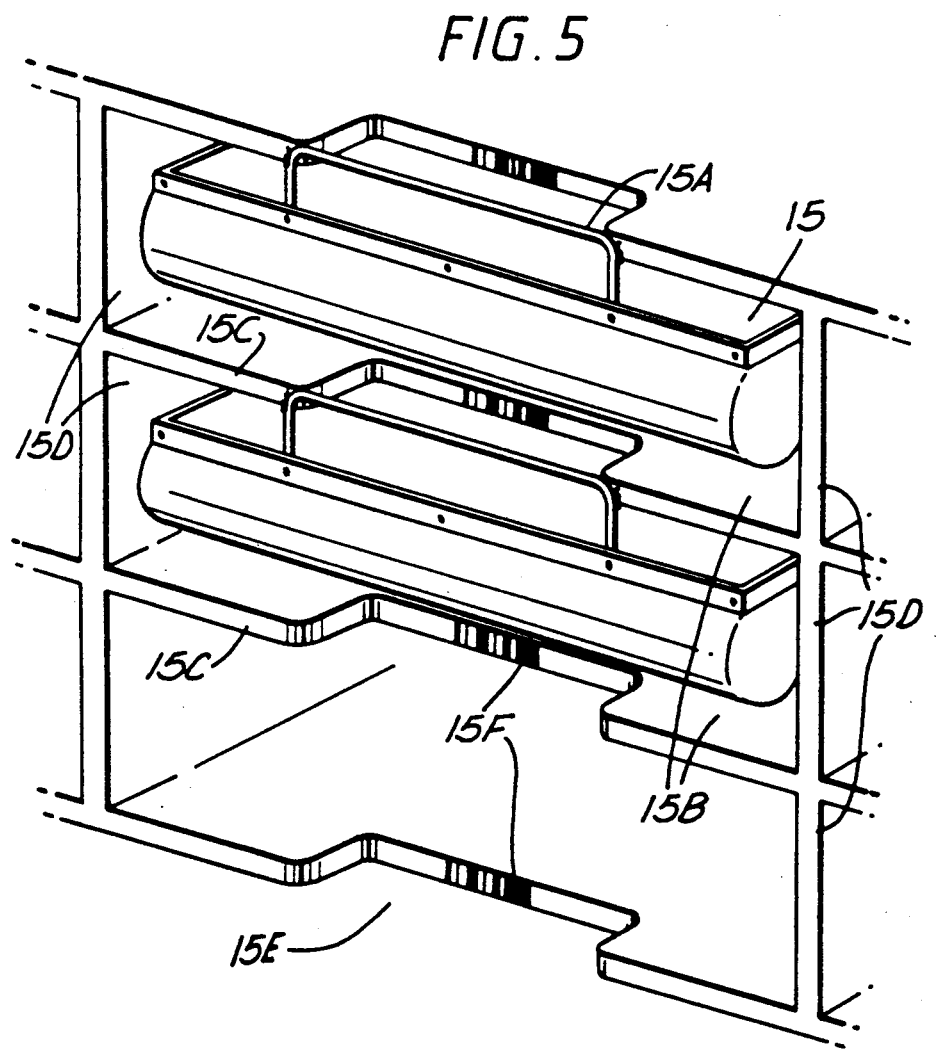

APPARATUS FOR RECEIVING ARTICLES, STORING THEM AFTER PROCESSING AND SUBSEQUENTLY RE-ISSUING THEM

It is already known to provide apparatus for use in conjunction with processing establishment, such as laundries and dry-cleaning works, or in conjunction with collection and distribution centres for such establishments, whereby a customer can deposit articles to be processed, for example garments to be laundered, at a time when the processing establishment or collection and distribution centre is closed and no attendant is present, and can later collect the articles after processing of them, again when the processing establishment or collection and distribution centre is closed and no attendant is present; for example see United Kingdom Patent Specifications Nos. 1107988, 1317306, 1423135, 1604040 and 2080264. It is common for there to be N article-storage locations in the apparatus to receive articles from N or fewer customers, so that each customer has allocated to him one or more specific article-storage locations, to receive carriers destined to receive articles to be processed from that customer only and later to receive processed articles awaiting collection by that customer only. The result is that, at any one time, at many of the article-storage locations there are merely carriers awaiting use and, for dealing with a certain number of customers, there must be more storage locations, and the apparatus must in consequence be larger and more expensive, than is necessitated by the number of articles received for processing. It is also common for there to be N article carriers to receive articles from N or fewer customers, so that each customer has allocated to him one or more specific article carriers, to receive articles to be processed from that customer only, before transfer of the articles with the carrier or carriers to the processing point, and/or to receive processed articles awaiting collection by that customer only before transfer of the articles with the article carrier or carriers to a re-issue location. The result is that at any one time many of the article carriers are not in use and in consequence more of them must be provided than is necessitated by the number of articles received for processing.

It is an object of the invention to provide apparatus in which a storage location is not specifically and for a long time (e.g. a month or months) allocated to a specific customer, so that any one storage location may within a month, for example, store the articles of a number of different customers in succession and the apparatus can serve a large number of customers with a smaller number of storage locations and/or to provide apparatus in which an article carrier is not specifically and for a long time (e.g. a month or months) allocated to a specific customer, so that any one article carrier may within a month, for example, carry the articles of a number of different customers in succession and the apparatus can serve a large number of customers with a smaller number of article carriers.

According to a first aspect of the invention, there is provided apparatus in which articles are received, stored after processing and subsequently reissued, the apparatus comprising a reception location, a reissue location which may be the reception location or another location, a number of unloaded-carrier storage locations, a number of article carriers, a number of processed-article storage locations, transport means for transporting the articles and control means whereby when a customer presents a suitable information-bearing device this is automatically scanned and a suitable unloaded article carrier is automatically taken from an unloaded-carrier storage location by the transport means and delivered to the reception location at which the customer may arrange for his article or articles to be carried by the article carrier before it is automatically carried away by the transport means, and information relating his information-bearing device to the article carrier is automatically stored, and, after his article or articles has or have been processed and when it or they is or are delivered to a selected one or plurality of the processed-article storage locations, information concerning a newly created, i.e. not previously existing, relationship between the customer's information-bearing device and the selected processed-article storage location or locations is stored, and the article or articles is or are later automatically delivered by the transport means to the re-issue location, at which the customer may retrieve it or them, when a suitable information-bearing device is presented.

According to a second aspect of the invention, there is provided apparatus in which articles are received, stored after processing and subsequently reissued, the apparatus comprising a number of processed-article storage locations, a reception location, a reissue location which may be the reception location or another location, a number of unloaded-carrier storage locations, each with its own identification means, a greater number of article carriers, each with its own identification means bearing no permanent relationship with the identification means of any specific one of the unloaded-carrier storage locations, transport means for transporting the articles and control means whereby, before receipt of an article or articles for processing, the identification means of an unloaded article carrier may be scanned and the identification means of a selected unloaded-carrier storage location at which the article carrier has just been stored or is about to be stored may also be scanned, there being no correlation prior to this scanning between the article carrier and the specific unloaded-carrier storage location which is selected, and information resulting from the two scannings and representing a temporary relationship between the article carrier and the selected unloaded-carrier storage location is stored and this process may be repeated for other unloaded article carriers and other unloaded-carrier storage locations and the control means being such that when a customer presents a suitable information-bearing device this is automatically scanned and a suitable unloaded article carrier is automatically taken from its unloaded-carrier storage location by the transport means and delivered to the reception location at which the customer may arrange for his article or articles to be carried by the article carrier before it is automatically carried away by the transport means and information relating his information-bearing device to the article carrier is automatically stored, and his article or articles, after processing and subsequently being delivered to a selected one or more of the processed-article storage locations, is or are later automatically delivered by the transport means to the re-issue location, at which the customer may retrieve it or them, when a suitable information-bearing device is presented.

The apparatus may be constructed to receive, for example, articles, for example garments, for dry-cleaning and/or articles for laundering and/or articles, for example shoes, for repair or other processing, for example films for developing and printing. The re-issue location may be also the reception location and the information-bearing device which is used to retrieve the processed article or articles may be the same information-bearing device as is used to obtain the unloaded article carrier and it may be scanned for retrieval of the article or articles by the same scanning means as is used to scan it on initially depositing the article or articles for processing. Preferably, the apparatus is constructed to respond to any one of a range of information-bearing devices including credit cards such as "Access", "Visa", "American Express", etc., and preferably also including credit cards or tokens issued by the owners of the apparatus or by the dry-cleaners and/or launderers or other processors of the articles.

The article carriers are preferably bags and/or boxes.

Examples in accordance with the invention are described below with reference to the accompanying drawings, in which:

FIGS. 1A, 1B, 1C and 1D show diagrammatic plan views of four possible arrangements of part of an apparatus for receiving from a customer articles for processing, storing them after processing and returning them from store to the customer, FIG. 2 shows a perspective view of storage means in the apparatus, FIG. 3 shows a view of part of the storage means, as seen when looking in the direction of the arrow III in FIG. 2, FIG. 4 shows a detail of FIG. 3, and FIG. 5 shows another part of the storage means, as seen when looking in the direction of the arrow V in FIG. 2.

Figure 1C:
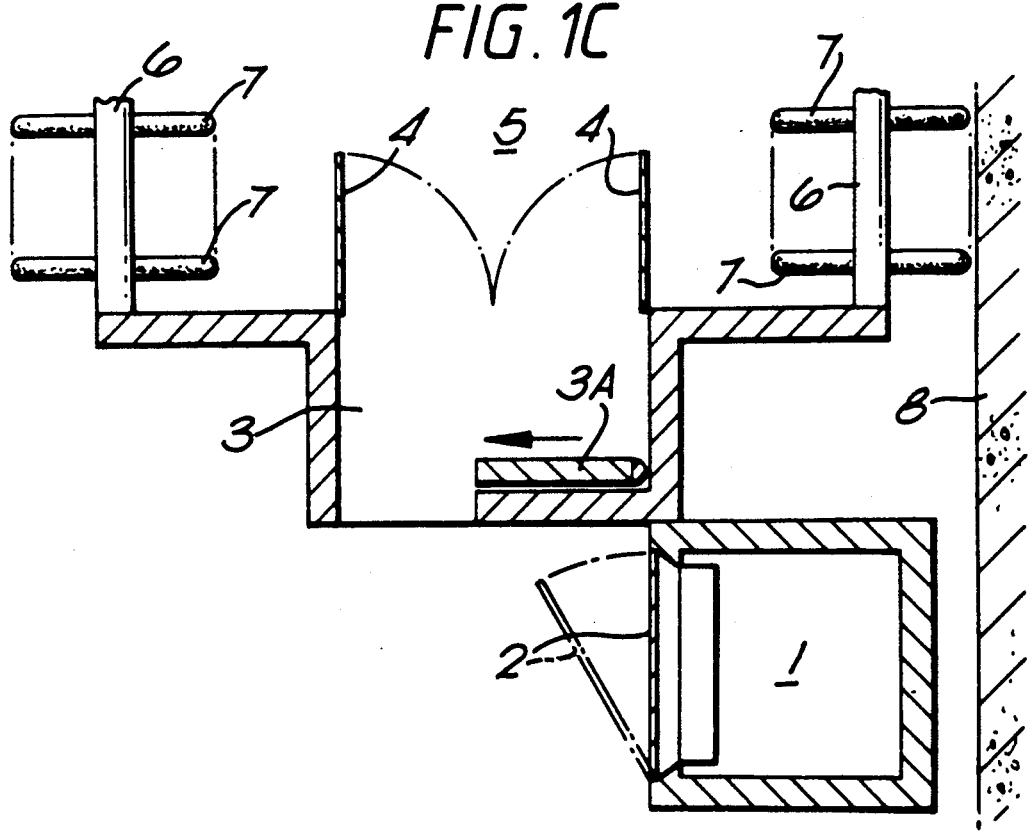
Figure 1B:
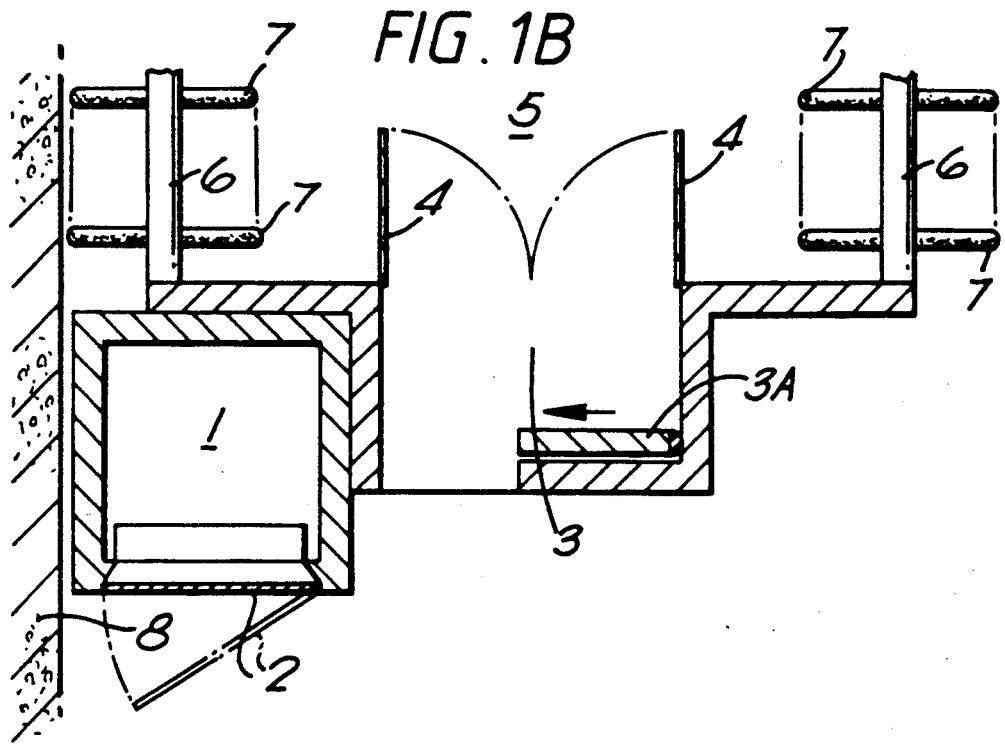
Figure 1D:
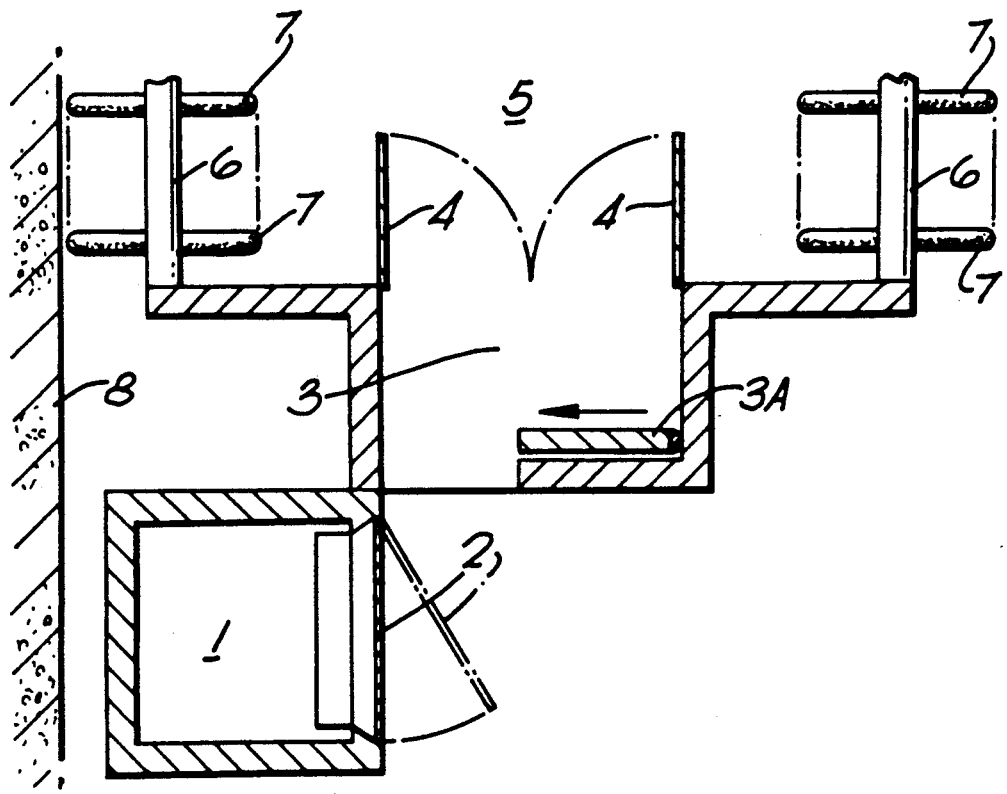

Each of the arrangements shown in FIGS. 1A, 1B, 1C and 1D includes a part 1 containing control equipment to which a service engineer has access when a door 2 is opened. On the side of the part 1 at which the door 2 is situated there is a slot into which a customer can insert an information-bearing device which identifies him, prior to depositing at part 3 of the apparatus, at its front, i.e. at the side thereof which is shown lowermost in each of FIGS. 1A, 1B, 1C and 1D, articles to be processed, for example garments to be dry-cleaned. Subsequently, after processing of the articles, he may insert the same information-bearing device or another information-bearing device in the same or another slot at the part 1 and retrieve his articles from the front of the same part 3 of the apparatus. The part 3 of the apparatus has a door 3A which automatically slides to the left, as indicated by the arrows, to permit articles to be inserted into or taken from the part 3 and which automatically slides to the right subsequently. The part 3 has doors 4 communicating with a storage zone 5 in which there are two parallel rails 6 from which cleaned articles 7 are suspended. FIGS. 1A and 1B show these parts 1 to 6 on the left side and on the right side, respectively, of a wall 8, with the door 2 in each case near the wall 8, whereas FIGS. 1C and 1D show the parts 1 to 6 on opposite sides of a wall 8 but here the part 1 is brought forward with respect to the remainder of the apparatus and its door 2 is on its side which is furthest from the wall 8. The parts 1 and 3 are two separate metal-framed compartments which can be installed in a variety of relative positions to best suit the requirements at the site.

Referring now to FIGS. 2 and 3, each rail 6 provides a number of storage locations for cleaned articles. Each storage location is afforded by a ring 10 supported by a carrier 9, made of wire, which is received in a respective slot in the rail, the rings 10 being capable of receiving the hooks on conventional wire clothes hangers 11, as shown in FIG. 4 of United Kingdom Patent Specification No. 2080264. Beside each storage location is a unique bar code identifying that storage location. Above one of the rails 6 there are a number of tubes 13 arranged in three rows for receiving rolled-up empty bags (referred to below as "deposit bags") with devices 14, e.g. handles, shown in FIG. 4, on the bags which are engaged by a pick-off device when bags are to be withdrawn from the tubes. The tubes rest on shelves 13A on which there are bar codes 13B designating the different storage locations for empty bags. Above the other rail 6 there are rows of parcel bags or boxes 15 on shelves 15C, the bags or boxes having handles 15A, to be engaged by a pick-off device, when the bags or boxes are to be removed from compartments 15B formed by the shelves 15C and partitions 15D. The shelves 15C are formed with notches 15E which receive the handles 15A and the shelves have bar codes 15F in the notches to identify the storage locations for the bags or boxes 15.

Above a central walkway 16 between the rails 6 there is a gantry 17 which can be moved to and fro along a line parallel to the rails 6. Suspended from the gantry 17 is a pick-off mechanism which includes a part 18 which can be turned about a vertical axis and an arm 19 which is attached to the rotatable part 18 and carries at opposite ends two pick-off devices 20 and 21, which can be moved in both directions parallel to the arm 19. The pick-off device 20 is so constructed that it can be used to pull a bag from a selected one of the tubes 13, or a bag or box from one of the shelves 15C, and the pick-off device 21 is so constructed, for example as shown in FIG. 4 of Specification No. 2080264, that it can pick off a selected hanger 11, carrying cleaned garments surrounded by a polythene cover bag 22, from a selected one of the rails 6. For this purpose, the parts 18 to 21 can be raised and lowered as required. The picked-off bag, box or hanger is conveyed by the gantry into the part 3 of the apparatus. As the gantry approaches, the doors 4 automatically open to admit it to the part 3 and the doors 4 then close and remain closed, with the gantry in the part 3, until the gantry is about to return from the part 3 to the storage zone 5. The door 3A can be open only when the doors 4 are closed.

As FIG. 3 shows, there are groups of storage locations, on rails 6, assigned to receive small, medium and large articles or groups of articles. If desired, there could be two or more rails 6 above one another, especially in a part of the apparatus destined to receive short articles.

The deposit bags have zip fasteners at their fronts and there are far more of them than there are tubes 13 to contain them, for example 500 deposit bags to 100 tubes 13.

There are a number of possible methods in which the apparatus described can be used in conjunction with a computer.

METHOD A

1. Before a customer arrives an operative has already put empty deposit bags, with bar-coded tags on them, at randomly chosen vacant bag storage locations, i.e. in empty tubes 13, and on each occasion he has scanned a bar code on or beside the tube in question and the bar code of the bag tag and the computer has recorded the signal so obtained so that it "knows" which bag tag is at which storage location and which storage locations are vacant.

2. A customer arrives and inserts a credit card, a card reader in the apparatus inspects it and, if it finds it satisfactory, instructs the customer to key in his telephone number, at a first keypad at the front of the part 1, near the above-mentioned slot, which he does, and then he presses an "enter" button. On a second keypad, he inserts, when instructed by the apparatus, details of articles being deposited for dry-cleaning. This may, for example, involve pressing twice a button marked "trousers" and once a button marked "dress", if he has two pairs of trousers and one dress to be cleaned. He also looks at a display of individual prices charged and of the total charge and presses a "total" button if satisfied or a "cancel" button if not. The computer prepares a printed record of the transaction, which is issued to the customer, and determines from the list of articles an appropriate bag size. A suitable bag is pulled out of its tube 13 and delivered to the customer by the gantry at part 3 of the apparatus.

3. The computer records the credit card number, the number of the empty bag storage location (tube 13) from which the bag was taken and the (different) bag tag number. An operative can now immediately put another empty bag, with another bag tag on it, in the same storage location, ready to be used by another customer.

4. When the first bag arrives at the part 3 of the apparatus, the door 3A opens and the first customer puts the articles to be cleaned into the bag and closes the bag with the zip fastener and the door 3A closes and the bag is automatically taken away by the gantry to a soiled articles storage area, for example the floor of the storage zone 5. The printed record is issued to the customer before the door 3A closes.

5. Each article is then marked to identify it with the number of the bar-coded tag on the bag from which it was taken and the bag tag is detached from the bag. The bag then has a fresh tag applied to it and it is rolled up and inserted in an empty tube 13.

6. The marked articles taken from the bags are periodically taken away manually, cleaned and then returned to the illustrated apparatus, with the bag tag numbers still on them and the bag tags themselves travel with them, since each of them is attached after the cleaning process to the article or one of the articles associated with that bag tag.

7. The articles are checked against a printed record of the contents of the bags both before cleaning them and after their return to the illustrated apparatus after cleaning. An operative decides which of a number of vacant cleaned-article storage locations (on the rails 6) is to receive the article or articles bearing one bag tag number, the choice of storage location being to some extent random but always to best suit the articles to be stored, and he uses a sensor to scan the bag tag number on the bag tag and the bar code associated with the selected cleaned-article storage location and the computer then "knows" that the article or articles has or have been returned and it stores the information relating the bag tag number to the storage location bar code. The bar coded bag tag is then no longer needed for the transaction in question and it is eventually used again for another customer or the same customer. The computer records the cleaned-article storage location in association with the bag tag number and credit card number and this information is printed. Then the information about the bag tag number is erased from the computer so that it therefore only records the credit card number in relation to the cleaned article storage location.

8. Upon re-presentation of the credit card, the cleaned article or articles is or are picked off from the appropriate one of the rails 6 and returned by the gantry to the part 3 of the apparatus, where the customer can receive it or them and take it or them away. This is the end of METHOD A.

When the empty bags, with bag tags attached to them, are inserted in vacant tubes 13, the operator could, on each occasion, scan the tube number and then the bag tag number, using a pen-type bar code scanner linked directly or indirectly to the memory of the computer. A similar scanner is used for each scanning operation. The computer is programmed to reject signals resulting from incomplete codes.

If the articles originally deposited by the customer are too numerous to be accommodated at a single cleaned-article storage location, they may be stored at two or more such locations, in which case by appropriate scanning of the storage location numbers and of the bag tag numbers on the bag tags, there will be provided for the computer an indication of the appropriate storage location numbers.

The computer has at all times a record of what tubes 13 are vacant and at what cleaned-article storage locations there are cleaned articles awaiting collection, also the numbers of the credit cards of their owners. If a customer comes for his articles before they are ready for collection, the computer can at once inform him that they are not ready, without instructing the pick-off mechanism to try to remove the cleaned articles from the rails 6.

METHOD B

Empty deposit bags are bar-coded, either directly or by having bar-coded tags attached to them, or code transmitters are attached to them. When they are inserted in the tubes 13 they are not scanned but information about which tubes 13 contain bags is given to and recorded at the computer. The steps of METHOD A, part 2 are performed, the bag called for by the customer being taken from the next tube in a pre-set sequence of the tubes. The steps of METHOD A, part 4 are performed. Each bag on its way to, at, or on its way from the part 3 of the apparatus is automatically scanned by a scanner, or the customer uses a pen-type bar scanner to scan it, and in either case there are transmitted to the computer the bag number and the number of the customer's credit card, which are correlated at the computer. After arrival of the bag in the storage zone 5, the steps of METHOD A, parts 5 to 8 are performed if bag tags are employed and analogous steps are performed if bag tags are not employed.

METHOD C

Bags are taken from the tubes 13, which do not have to be numbered, in predetermined sequence and at that stage the bags are not numbered, although they do bear an indication of the identity of the apparatus from which they come. The steps of METHOD A, parts 2 and 4 are performed and shortly before an empty bag arrives at the part 3 of the apparatus, or whilst the bag is there, the computer assigns a bag number to it. The computer records the bag number and the credit card number and prints and issues to the customer not the printed record mentioned above but a receipt, in duplicate, for the articles recorded by the customer as having been put in the bag, the receipt bearing the assigned bag number, and the customer is required to put one of the two copies of the receipt in the bag, whereby the customer applies the bag number to the bag, before the bag is automatically carried away. Thereafter steps analogous to METHOD A, parts 5 to 8 are performed.

In all three methods there is no correlation, prior to the articles being returned to the apparatus after cleaning, between the customer's credit card number and the cleaned-article storage location or locations at which his cleaned article or articles is or are stored. This correlation is set up only when his article or articles is or are allotted a cleaned-article storage location or two or more such locations and it ceases to exist when he has collected his cleaned article or articles.

METHODS A, B and C have been described in relation to dry-cleaning only, for simplicity, but in addition to, or instead of, articles for dry-cleaning, a customer could deposit articles for laundering and/or articles, for example shoes, for repair or other processing. Articles which have been laundered could be stored on hangers on the rails 6, or on similar rails, and shoes which have been repaired could be stored in the bags or boxes 15.

It is possible for the storage arrangement on each side of the central walkway 16 to be divided into a number of bays, for example bay 1 being what is shown in FIG. 3, bay 2 being to the right of it, bay 3 being to the right of that and so on. It is possible for there to be in each bay two, three or more tiers of article-storage means, for example a lower rail 6, a middle rail 6 directly above it and an upper rail 6 directly above that, with suitable spaces between the rails so that garments may be hung from them.

Upon a customer returning to the apparatus to collect his article or articles, a main computer could check the customer's credit card number against its memory of assigned article-storage positions and instruct a microprocessor which operates the gantry as to the sequence of operations necessary to retrieve the required article or articles. If, for example, there were only one article to be retrieved, this one hanging from the central rail in bay 2 of a three-tier storage arrangement, the gantry could proceed in a direction parallel to the rails 6 until it reaches a vertical rail adjacent to bay 2. Then the gantry would stop and the pick-off mechanism carried by it would engage a vertical guide member and descend to the required level. Once this level was reached, as sensed by sensors carried by the pick-off mechanism, the pick-off mechanism would disengage from the vertical guide member and engage a horizontal guide rail and then the gantry would proceed, again in a direction parallel to the rails 6, along the bay 2 until the pick-off sensors command it to slow and eventually stop at the required position. During the final stage of its travel, the pick-off mechanism could be turned if necessary by rotation of the part 18. When the required pick-off device is in the appropriate position, it is displaced to the left or to the right (considering FIG. 2) to pick-off the required clothes hanger or box.

If the customer's credit card number has been correlated to two or more article-storage positions, for example one for dry-cleaned articles, one for laundered articles and another for a pair of shoes which have been repaired, the apparatus could be instructed to select the shortest item first and when the pick-off device 20 or 21 has withdrawn with it to its rest position (shown in FIG. 2) the part 18 could be rotated to deliver the picked-off item onto an order accumulation rail carried by the gantry. Then in a similar way the next shortest item could be picked-off and put on the order accumulation rail carried by the gantry and finally the longest item and only then will the gantry be displaced to the part 3 of the apparatus.

In a case where the illustrated apparatus is located within a dry-cleaning establishment, it may be desirable to extend the storage rails 6 into the dry-cleaning establishment and have there a second location at which articles to be processed can be deposited and/or from which processed articles can be collected, so that customers who prefer to deposit and/or collect articles during normal business hours and to deal with the staff there, rather than with automatic apparatus, can do so at the same time as other customers are depositing and/or collecting articles at the apparatus which is shown in the drawings. Then there could be a second gantry to serve the second deposit and/or reissue location.

I claim:

1. An apparatus for receiving articles to be processed, for storing said articles prior and subsequent to said processing, and subsequently reissuing processed articles to appropriate customers in response to customer supplied information comprising:

a plurality of first article carriers for received articles;

at least one first article carrier storage means for storing at least one of said plurality of first article carriers;

first identification means for uniquely identifying each separate one of said plurality of first article carriers;

a plurality of second article carriers for processed articles;

at least one second article carrier storage means for storing at least one second article carrier;

second identification means for uniquely identifying each separate one of said second article carrier storage means;

transport means for selectively transporting at least one of said first article carriers from said first article carrier storage means to an article reception location for loading by said customer, and for selectively transporting at least one of said second article carriers from said second article carrier storage means to an article reissue location for retrieval by said customer; and control means responsive to customer supplied information for selectively activating said transport means for automated handling of said articles, said control means having input means for receiving data corresponding to said first and second identification means and said customer supplied information, said control means further having central processing means for processing received data in accordance with a program stored in memory, said central processing means for creating and storing in memory a first temporary data relationship between said first identification means and said customer supplied information, generally in conjunction with presenting a first article carrier from said first article carrier storage means to said article reception location for loading with an article to be processed by a customer, said central processing means for further creating and storing in memory a second temporary data relationship between said customer supplied information and said second identification means, generally in conjunction with storing a processed article in said second article carrier storage means.

2. The apparatus of claim 1 further comprising:
said at least one first article carrier storage means including a plurality of first article carrier storage locations;
third identification means for uniquely identifying each separate one of said plurality of first article carrier storage locations; and
said control means further for creating and storing a third temporary data relationship between said first identification means and said third identification means, generally in conjunction with storing said first article carriers in said first article storage locations.

3. The apparatus of claim 2 further comprising:
said first, second and third identification means including permanently attached bar codes; and
said input means including a bar code scanner.

4. The apparatus of claim 2 further comprising:
said plurality of first article carrier storage locations comprising a plurality of tubes, each tube having a unique identifying bar code;
said plurality of first article carriers including a plurality of deposit bags, each deposit bag having handles attached thereto and a unique identifying bar code;
said transport means including a pick-off device engageable with said handles of said deposit bag for removing a deposit bag from a corresponding storage tube; and
said input means including a bar code scanner.

5. The apparatus of claim 1 further comprising:
said transport means including a gantry movable along a path parallel to said first and second article carrier storage means, a rotatable part pivotable about a vertical axis, an arm attached to the rotatable part, and first and second pick-off devices attached to opposite ends of said arm capable of movement in both directions parallel to said arm, said arm adapted for movement up and down along said vertical axis, said first and second pick-off devices adapted for engagement with said first and second article carriers respectfully for removal of said first and second article carriers from said first and second article carrier storage means respectively.

6. An apparatus for receiving articles to be processed, for storing said articles prior and subsequent to said processing, and subsequently reissuing processed articles to appropriate customers in response to customer supplied information comprising:
a plurality of first article carriers for received articles, said plurality of first article carriers including a plurality of deposit bags, each deposit bag having handles attached thereto and a unique identifying bar code;
at least one first article carrier storage means for storing at least one of said plurality of first article carriers, said at least one first article carrier storage means including a plurality of first article carrier storage locations, said plurality of first article carrier storage locations comprising a plurality of tubes, each tube having a unique identifying bar code;
first identification means for uniquely identifying each separate one of said plurality of first article carriers;
a plurality of second article carriers for processed articles;
at least one second article carrier storage means for storing at least one second article carrier;
second identification means for uniquely identifying each separate one of said second article carrier storage means;
transport means for selectively transporting at least one of said first article carriers from said first article carrier storage means to an article reception location for loading by said customer, and for selectively transporting at least one of said second article carriers from said second article carrier storage means to an article reissue location for retrieval by said customer, said transport means including a gantry moveable along a path parallel to said first and second article carrier storage means, a rotatable part pivotable about a vertical axis, an arm attached to the rotatable part, and first and second pick-off devices attached to opposite ends of said arm capable of movement in both directions parallel to said arm, said arm adapted for movement up and down along said vertical axis, said first and second pick-off devices adapted for engagement with said first and second article carriers respectfully for removal of said first and second article carriers from said first and second article carrier storage means respectively, said transport means including said first pick-off device engageable with said handles of said deposit bag for removing a deposit bag from a corresponding storage tube;
control means responsive to customer supplied information for selectively activating said transport means for automated handling of said articles, said control means having input means for receiving data corresponding to said first and second identification means and said customer supplied information, said input means including a bar code scanner, said control means further having central processing means for processing received data in accordance with a program stored in memory, said central processing means for creating and storing in memory a first temporary data relationship between said first identification means and said customer supplied information, generally in conjunction with presenting a first article carrier from said first article carrier storage means to said article reception location for loading with an article to be processed by a customer, said central processing means for further creating and storing in memory a second temporary data relationship between said customer supplied information and said second identification means, generally in conjunction with storing a processed article in said second article carrier storage means;
third identification means for uniquely identifying each separate one of said plurality of first article carrier storage locations; and
said control means further for creating and storing a third temporary data relationship between said first identification means and said third identification means, generally in conjunction with storing said first article carriers in said first article storage locations.

7. A method for receiving articles to be processed, for storing the articles prior and subsequent to processing, and for subsequently reissuing said articles to appropriate customers in response to customer supplied information comprising the steps of:

receiving first input of customer supplied information;

associating a first identification means in response to customer supplied information with a first article carrier supporting at least one article received for processing;

creating and storing a first temporary data relationship between said first identification means and said customer supplied information;

printing a transaction summary, including the customer supplied information, according to a program stored in memory;

removing each article from said first article carrier;

marking each removed article with said first identification means;

processing each of said removed articles;

supporting processed articles with a second article carrier;

storing said second article carrier in a second article carrier storage means having a plurality of storage positions;

inputting a second identification means for each storage position occupied by a second article carrier in said second article carrier storage means and a corresponding first identification means for said processed articles supported by said second article carrier;

creating and storing a second temporary data relationship between said second identification means and said customer supplied information;

printing a summary of processed articles including a listing of customer supplied information, first identification means and second identification means;

after creating and storing the second temporary data relationship, deleting the corresponding first temporary data relationship from memory;

receiving second input of customer supplied information;

automatically retrieving at least one particular second article carrier from a particular storage position identified as corresponding to said customer supplied information from said second temporary data relationship stored in memory, said second temporary data relationship indicating a second identification means corresponding to said customer supplied information within said second article carrier storage means defining a particular storage location;

delivering said retrieved second article carrier to a reissue location for customer retrieval of said processed articles; and after delivery of said at least one particular second article carrier to said reissue location, deleting said second temporary data relationship from memory.

8. The method of claim 7 wherein said associating step further comprises the steps of:

storing empty first article carriers in said first article carrier storage means;

inputting first identification means attached to each first article carrier and a corresponding third identification means corresponding to a respective position in said first article carrier storage means;

creating and storing in memory a third temporary data relationship between said first and third identification means;

delivering a first article carrier to an article reception location in response to said first input of said customer supplied information; and after creating and storing said first temporary data relationship, erasing said third temporary data relationship.

9. The method of claim 7 wherein said associating step further comprises the steps of:

storing empty first article carriers in said first article carrier storage means;

delivering a first article carrier to an article reception location in response to said first input of said customer supplied information;

while printing said transaction summary, simultaneously printing a duplicate copy including an assigned first identification means; and attaching said copy of said transaction summary to said first article carrier.

10. The method of claim 7 wherein said associating step further comprises the steps of:

attaching said unique first identification means to each of said first article carriers;

storing empty first article carriers in said first article carrier storage means;

delivering a first article carrier to an article reception location in response to said first input of said customer supplied information;

inputting a particular unique first identification means corresponding to a particular first article carrier delivered to said article reception location.

* * * * *